United States Patent [19]
Klein et al.

[11] Patent Number: 5,551,743
[45] Date of Patent: Sep. 3, 1996

[54] ARRANGEMENT OF A REAR LID OR THE LIKE ON THE BODY FRAME OF A MOTOR VEHICLE

[75] Inventors: Berthold Klein, Rutesheim; Hans-Joachim Ostertag, Sindelfingen, both of Germany

[73] Assignee: Mercedes-Benz AG, Stuttgart, Germany

[21] Appl. No.: 266,859

[22] Filed: Jul. 5, 1994

[30] Foreign Application Priority Data

Jul. 5, 1993 [DE] Germany ............. 43 22 285.4

[51] Int. Cl.⁶ ............................. B62D 25/10
[52] U.S. Cl. ............... 296/76; 49/248; 220/523; 296/136
[58] Field of Search ............. 296/76, 136, 146.8; 180/69.21, 69.2; 49/248, 250; 220/523, 526, 909

[56] References Cited

U.S. PATENT DOCUMENTS

| | | | |
|---|---|---|---|
| 2,647,788 | 8/1953 | Kaiser et al. | 296/76 X |
| 4,620,743 | 11/1986 | Eke | 296/146 |
| 4,819,982 | 4/1989 | Eyb | 296/136 X |
| 5,090,764 | 2/1992 | Kogawa et al. | 296/136 X |

FOREIGN PATENT DOCUMENTS

| | | |
|---|---|---|
| 0482681A1 | 4/1992 | European Pat. Off. . |
| 733380 | 10/1932 | France . |
| 3623468A1 | 1/1987 | Germany . |
| 3733892 | 4/1989 | Germany . |
| 3743502 | 7/1989 | Germany . |
| 4203871 | 8/1993 | Germany . |
| 4-300722 | 10/1992 | Japan ................ 296/76 |
| 842823 | 4/1960 | United Kingdom . |

OTHER PUBLICATIONS

Fr. Srch Rpt. dated Dec. 19, 1994.

Primary Examiner—David M. Mitchell
Assistant Examiner—Kia M. Robinson
Attorney, Agent, or Firm—Evenson, McKeown, Edwards & Lenahan

[57] ABSTRACT

An arrangement of a rear lid or the like on the body frame of a motor vehicle, particularly for vehicles with a storable roof structure, with a pivoted mounting of the rear lid by which the rear lid can be swung up into an erect loading position around an axis which extends close to one of its ends, providing accessibility to a two-part storage-space region through an opening in the frame which is freed when the rear lid is swung up, a part of the cress-section of the frame opening being associated with each of the two storage-space regions. In order that relatively easy accessibility to both storage space regions can be assured when the rear lid is swung up, the rear lid can be moved by a slide-swing mounting on the body frame into a loading position in which the partial cross-sections of the frame opening are conveniently accessible only from one side of the erected rear lid.

14 Claims, 5 Drawing Sheets

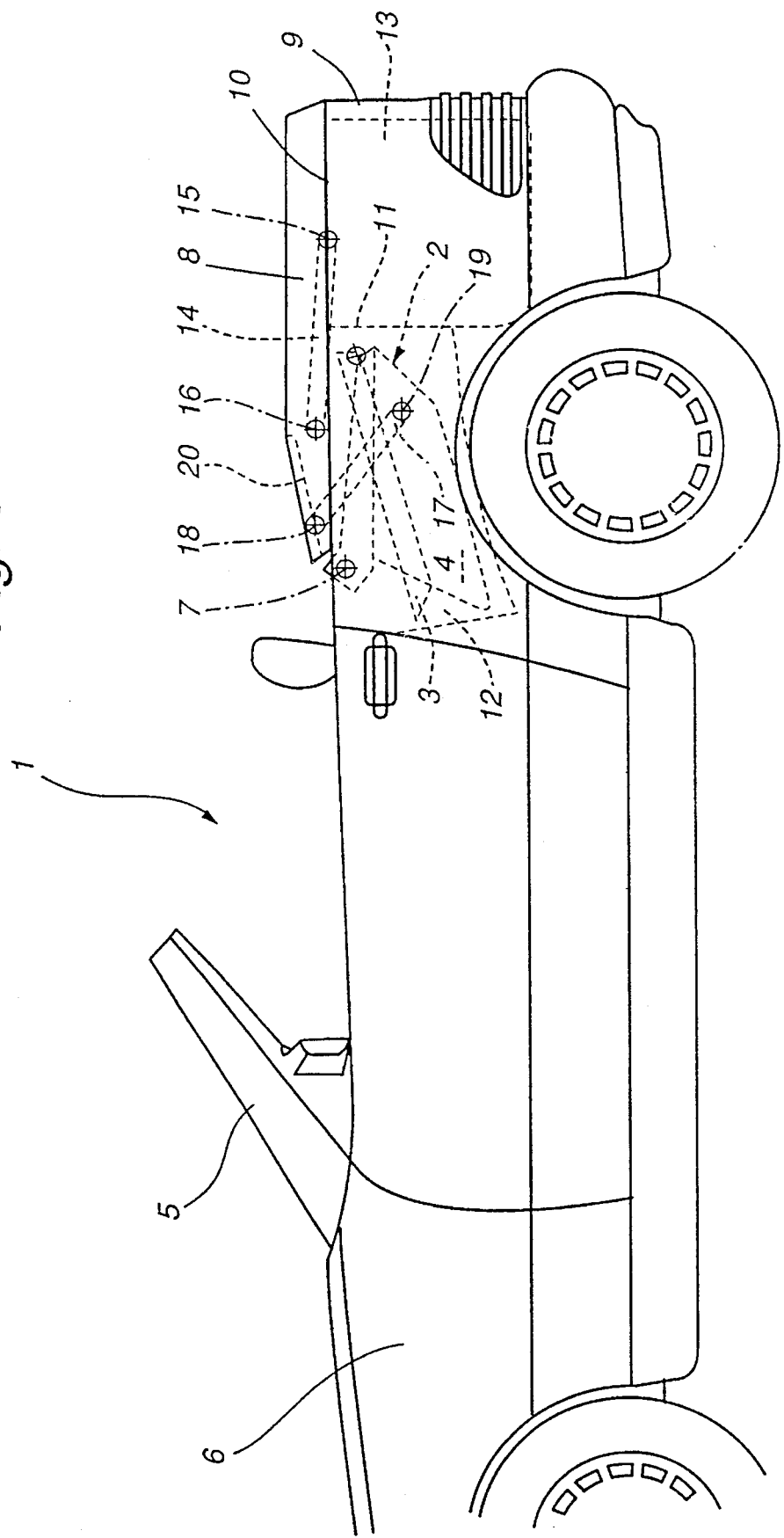

ARRANGEMENT OF A REAR LID OR THE LIKE ON THE BODY FRAME OF A MOTOR VEHICLE

BACKGROUND AND SUMMARY OF THE INVENTION

The present invention relates to an arrangement of a rear lid or the like on the body frame of a motor vehicle, particularly for vehicles with a storable top structure, having a pivoted mounting of the rear lid by which the rear lid can be swung up into a vertical loading position around an axis which extends close to one of its ends, with accessibility to a two-part storage-space arrangement through an opening in the frame which is freed when the rear lid is swung up, a partial cross-section of the opening in the frame being associated with each of the two storage-space regions.

An arrangement of the above-described type is shown in German Patent Document A1 37 33 892 in which the rear lid is pivoted along its rear end to the body frame. Since the rear lid is bent downwards in its rear lengthwise region, it can be swung up into a loading position in which it is directed upward behind the rear end. When the rear lid is open, the storage opening which is defined by the corresponding bent body frame is accessible from above and, with limitations, from behind. A multipartite, removable roof structure of the vehicle can be placed in the storage space, after which a predominant part of the storage space is still available as boot or luggage space. The loading of the available luggage space is, however, very cumbersome and difficult when the roof structure is present in the storage space, since the horizontal lengthwise region of the opening in the frame is substantially blocked by parts of the roof structure which are placed therein.

An object of the present invention is to provide an improved arrangement of a rear lid on the body frame of a motor vehicle of the initially described type in such a manner that, with the roof lid swung up into the erect loading position, relatively easy accessibility to both storage-space regions of the storage space can be assured.

This and other objects are achieved by the present invention which provides an arrangement of a rear lid on the body frame of a motor vehicle having a storable top structure, comprising a pivoted mounting of the rear lid by which the rear lid is swingable up into a vertical loading position around an axis which extends substantially at one end of the rear lid. A two-part storage space having an opening in the body frame is provided that is exposed when the rear lid is swung up to allow access to two regions of the two-part storage space, a partial cross-section of the opening in the body frame being respectively associated with each of the two storage-space regions. A slide-swing mounting is provided on the body frame and is coupled to the rear lid such that the rear lid is movable into the loading position in which the partial cross-sections of the opening of the body frame are respectively conveniently accessible only from one side of the swung up rear lid.

Based on the arrangement of the rear lid in accordance with the present invention, there can structurally be provided a position for loading in which the upward-swung rear lid itself only slightly interferes with storing in both of the regions of the storage space.

In principle, the present invention can be used advantageously in instances in which the load in one storage-space region would interfere with access to the second storage-space region. This applies, in particular, to articles of equipment which are generally carried along in the vehicle and placed in a storage-space region. Such articles of equipment may, for instance, be a spare wheel, tool kit, warning sign, first-aid kit, spare gasoline can, or the like, access to which should be possible regardless of the condition of loading of the trunk space.

With storage-space regions arranged one behind the other, the front storage-space region can advantageously be used as a place for the storing of a collapsible top-into which the collapsible top can be swung in a known manner around a horizontal transverse axis of the vehicle. In this case, the rear lid also represents the covering for the stored collapsible top, so that a storage well cover can be dispensed with.

Depending on the purpose of use, in certain embodiments the storage-space regions are divided from each other by a partition. This is true, in particular, when one of the storage spaces is a wet space, for instance a top storage well.

In order to assure a high degree of comfort, certain embodiments of the invention provide kinematically positive swing-slide guidance of the rear lid.

The upward swung rear lid itself only slightly impairs access to the two regions of the storage space when plate-shaped and therefore no large bends from its main plane are present, in accordance with certain embodiment of the invention.

By a tapering of the rear lid in the region of its hinged end, the space required by the upward swung rear lid in the region of the opening in the frame is further reduced in certain embodiments.

In order to permit an upward swinging from the rear of the vehicle in the manner customary in connection with rear lids, the rear lid is preferably swingable around the axis which extends close to its front end.

Other objects, advantages and novel features of the present invention will become apparent from the following detailed description of the invention when considered in conjunction with the accompanying drawings.

BRIEF DESCRIPTION OF THE DRAWINGS

FIG. 5 is a diagrammatic side view of the convertible with its collapsible top stored away and its rear lid closed.

DETAILED DESCRIPTION OF THE DRAWINGS

Figure 1:
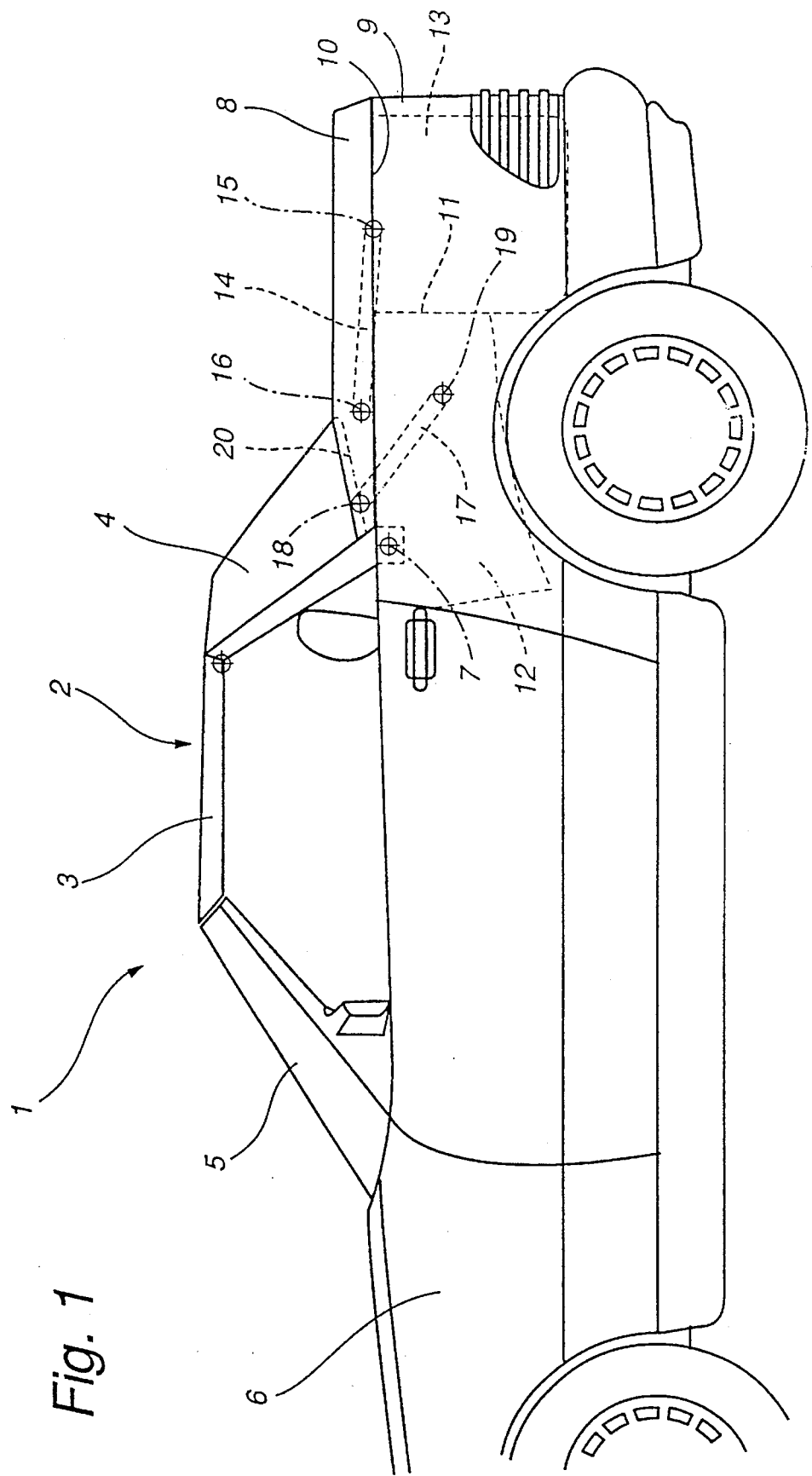
FIG. 1 shows diagrammatically a side view of a convertible constructed in accordance with an embodiment of the present invention with its collapsible top closed and its rear lid closed.

A two-seater convertible 1 is provided with a completely storable collapsible top 2, which comprises a front top part 3 and a rear top part 4. With the collapsible top 2 closed as shown in FIG. 1, the front part 3 of the top extends from a frame member (not shown) of the body 6, to above a windshield 5 to an upper rear corner region of the side window cut-out. The region of the surface of the top adjoining its front part 3, namely the rear-window region, and the region of the lateral top posts are part of the rear part 4 of the top. This rear part 4 is pivotally attached to the front part 3 of the top, as indicated by the pivot point between the parts. Below the upper edges of the wall of the car, the rear part 4 is mounted for swinging around a main shaft 7 of the body 6. Downward protruding end regions of lateral top posts of the rear part 4 are used for the pivoting. On the lower, approximately U-shaped end between the lateral top posts, the rear part 4 of the top 2 rests on the upper side of a rear lid 8 which is locked fast to the body in a manner not shown in the drawing.

The closed rear lid 8 covers an opening 10 which is defined by a body frame 9 and through which access is possible to a storage-space arrangement lying behind the interior of the convertible 1. This storage-space arrangement comprises two well-shaped storage-space regions which are arranged one behind the other, separated by a common partition 11. The front storage-space region is developed as a convertible top storage well 12 within which the collapsible top 2 can be stored. Behind it, there is an ordinary trunk space 13 serving as a second storage-space region. Since the opening 10 in the frame lies in an approximately horizontal plane, the top storage well 12 and the trunk space 13 are accessible only from above, even when the rear lid 8 is open.

In order that the rear lid 8, after it is unlocked, is moved automatically under positive control into a loading position in which the rear lid 8, which is flat on its lower side, is directed steeply upward above the partition 11, the rear lid is articulated on its sides by pairs of links, which are in mirror symmetry to each other, to the side regions of the body frame 9. When the rear lid 8 is closed, an upper (first) link 14 extends, as seen from a pivot pin 15 which is firmly fastened to the frame, from the rear towards the front to a pivot pin 16 of the rear lid 8 which lies directly behind the rear part 4 (FIG. 1). Since the pivot pin 15 is arranged approximately in the longitudinal center of the trunk space 13 close to the frame opening 10, and the pivot pin 16 is arranged at a slight distance from the flat bottom side of the rear lid 8, the first link 14 extends from the rear to the front with only a slight rise from the horizontal. The other (second) link 17 of the pair of links which is for instance about one-third shorter in length, extends definitely more steeply from the rear towards the front, its center line forming an angle of about 45° with the flat bottom of the rear lid 8. Its front end is mounted approximately at the same height as the pivot pin 16 but further forward than the latter, on pivot pin 18 on the rear lid 8. On the other hand, a pivot pin 19 for the pivoting of the rear end of the second link 17 is fastened to the frame at a suitable distance below the rear lid 8 and behind the pivot pin 16. Since all pivot pins 15, 16, 18 and 19 extend at a right angle to the longitudinal center line of the convertible 1, the links 14 and 17 can thus be moved only in a vertical plane of swing which is parallel to the lengthwise central plane.

In the region of its front end, the top side of the rear lid 8 is inclined obliquely forward and downward, so that the end region is tapered in wedge shape. Into the region of the inclined surface, there is introduced a slide seat 20 on which the U-shaped end of the rear part 4, which is bevelled parallel to the bevelled top of the rear lid 8, rests with a sealing connection. By this support on the lowered slide seat 20, the rear part 4 of the top is advantageously prevented from swinging backwards.

Figure 2:
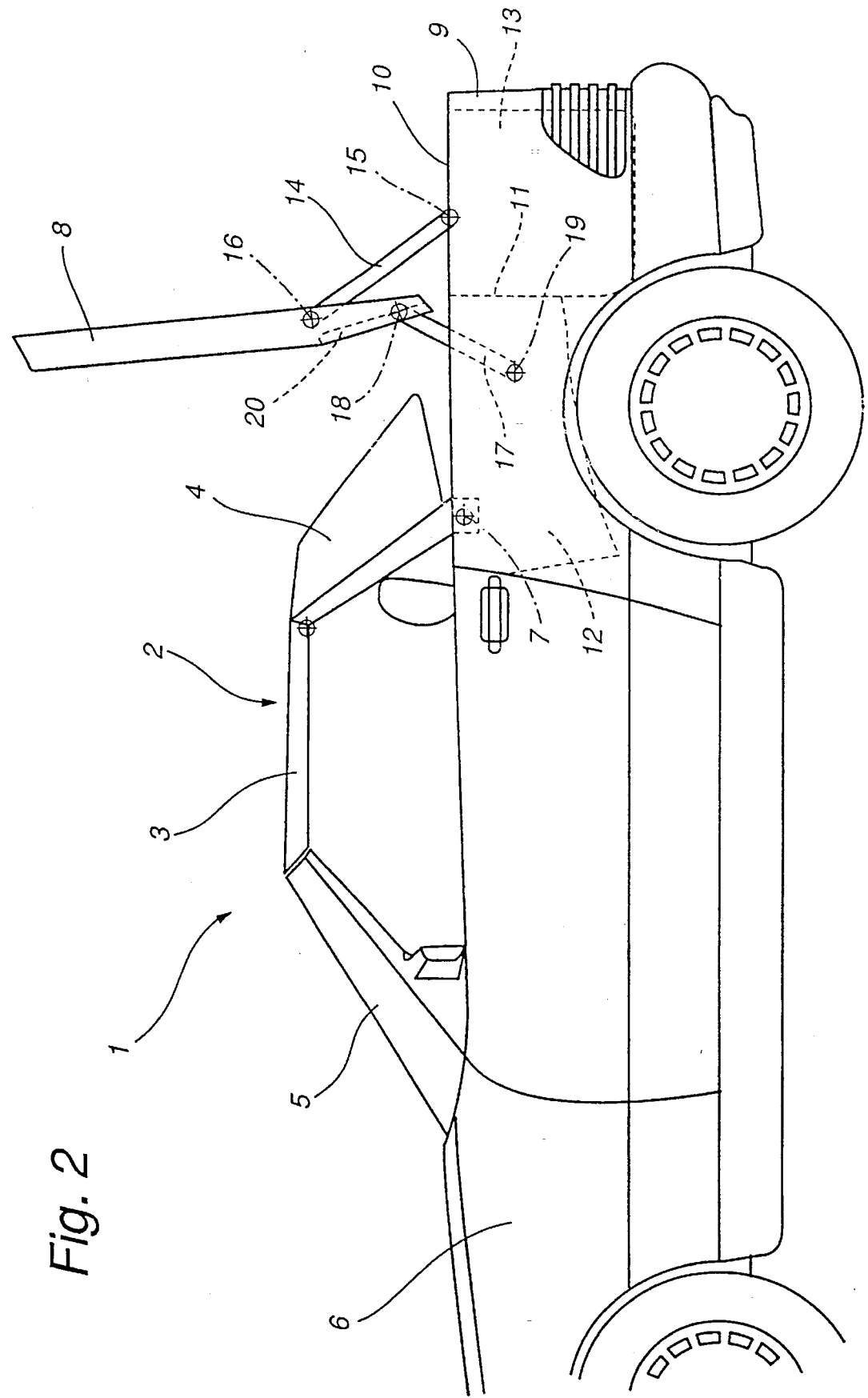
FIG. 2 shows diagrammatically a side view of the convertible of FIG. 1 with its collapsible top closed and its rear lid open.

If the rear lid 8 is now unlocked and lifted at its rear end, the rear lid 8 is imparted a swinging-sliding movement by the pairs of links which guide it on both sides. In this connection, the front end region of the rear lid 8 is pushed rearward, in the first phase of the opening motion, on a shallow circular path, the slide surface 20 being moved away towards the rear below the part 4 of the top. Upon further upward swinging, the curve of the path becomes steeper, as a result of which the rear lid 8 is moved into its loading position, shown in FIG. 2. In this loading position, which is almost vertical and only slightly inclined forwards, the edge between the front end and the bevelled surface of the rear lid 8 lies directly vertically above the partition 11, so that the entire cross-section of the entrance to the top storage well 12 is free. The cross-section of the opening 10 in the frame which devolves on the trunk space 13 is also substantially free, since the front end of the rear lid 8 is held at a distance above the opening 10 in the frame. The trunk space 13 can thus be conveniently loaded from the rear or, with minor limitations due to the upward-extending links 14, also from the side of the convertible 1, the head clearance being maximum.

Figure 3:
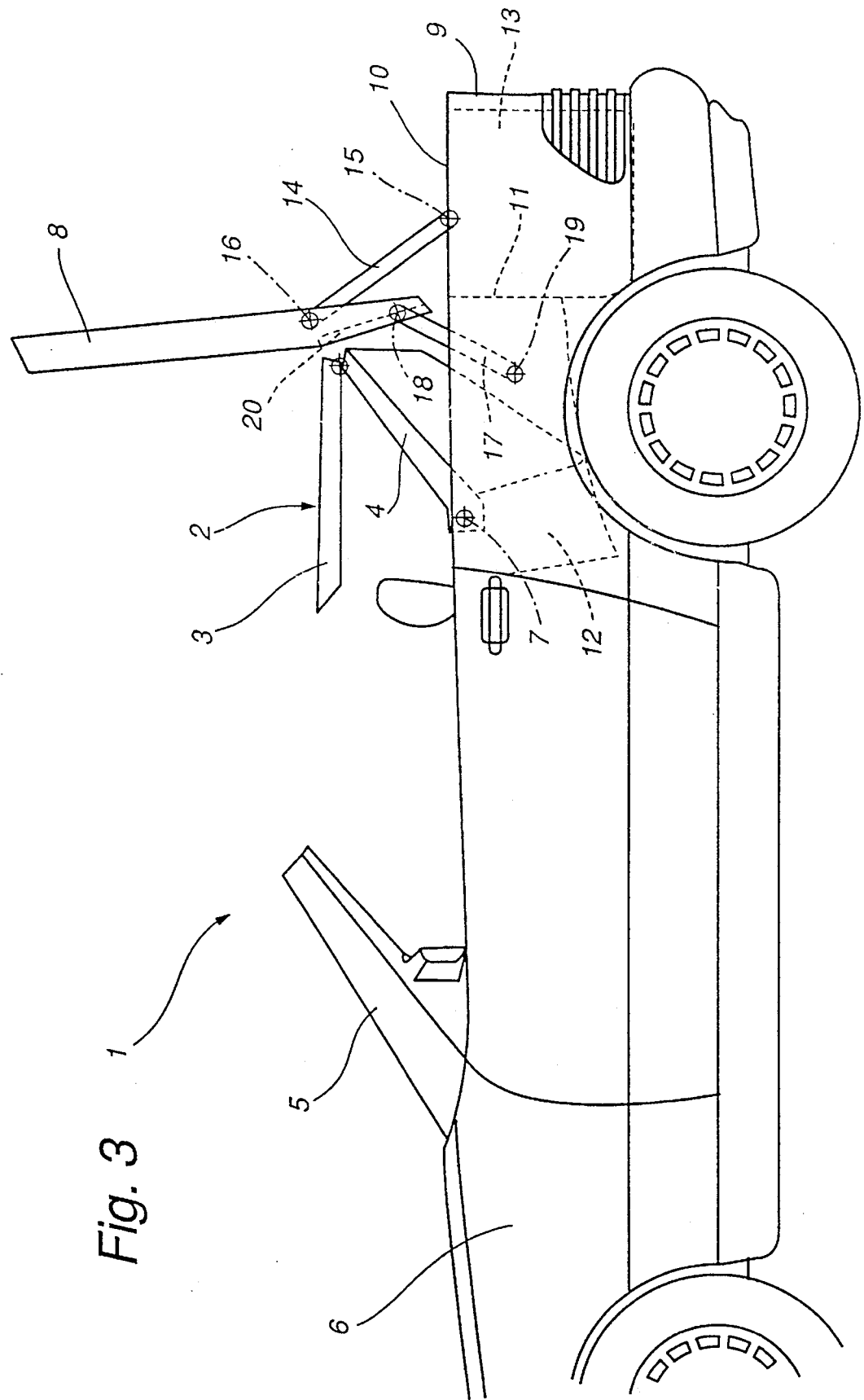
FIG. 3 is a diagrammatic side view of the convertible of FIG. 1 with its collapsible top partially stored away and its rear lid open.
Figure 4:
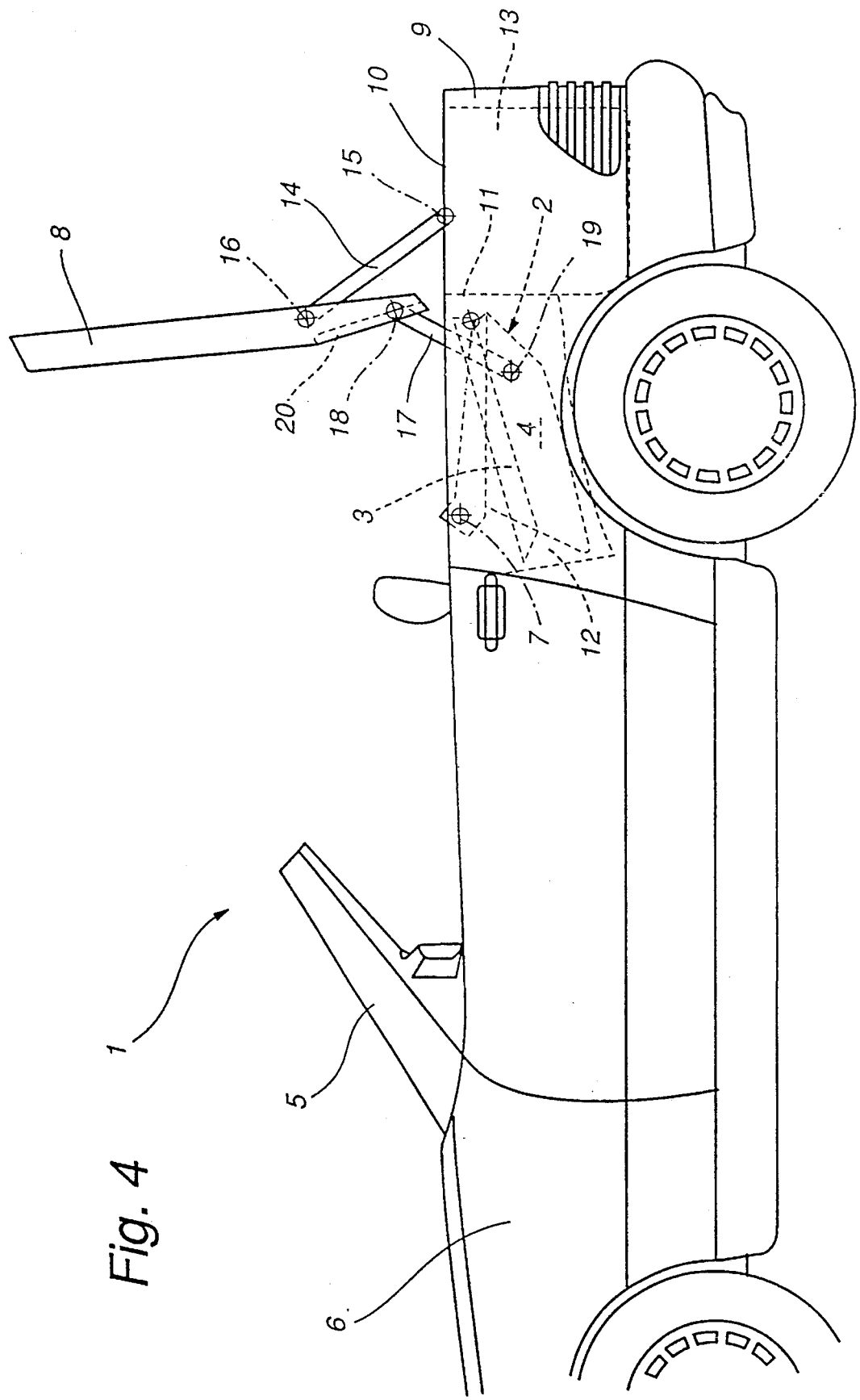
FIG. 4 is a diagrammatic side view of the convertible with the collapsible top completely stored away and its rear lid open.

As shown in FIGS. 3 and 4, the collapsible top 2 can also be lowered easily into the top storage well 12, in the loading position of the rear lid 8, by swinging it backwards around the main shaft 7. During the course of this backward swinging, the top parts 3 and 4 are swung together around their connecting axis in suitable manner, as a result of which the collapsible top 2 fits completely into the top storage well 12.

After the stowing of the collapsible top 2 and/or after the loading of the luggage space 13, the rear lid 8 can be swung back into its closed position, shown in FIG. 5, in which it covers the opening 10 in the frame, aside from passage slots above the main shaft 7. These passage slots in the top side of the walls of the car could possibly also be covered by separately arranged cover plates of known type. In this way, the collapsible top 2 would be stowed completely invisibly in the top storage well 12.

Naturally, the arrangement of the invention could be used not only in the case of the hardtop shown but also in the case of ordinary foldable fabric tops. Furthermore, every suitable cover for a two-part storage-space arrangement is to be considered a rear lid.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement of a rear lid on the body frame of a motor vehicle having a storable top structure, comprising:

a pivoted mounting of the rear lid by which the rear lid is swingable up into a vertical loading position around an axis which extends substantially at one end of said rear lid;

a two-part storage space having an opening in the body frame that is exposed when the rear lid is swung up to allow access to two regions of the two-part storage space, a partial cross-section of the opening in the body frame being respectively associated with each of the two storage space regions; and a slide-swing mounting on the body frame and coupled to the rear lid such that the rear lid is movable into the loading position in which the partial cross-sections of the opening in the body frame are respectively accessible in a vertical direction from a first side and a second side of the swung up rear lid, said first side being opposite said second side.

2. Arrangement according to claim 1, wherein the two storage space regions are arranged one behind the other, and the arrangement further comprising a collapsible top that is storable in the front storage space region, wherein the rear lid is swingable about a transverse axis of the vehicle.

3. Arrangement according to claim 1, wherein the storage space regions are spatially separated from each other.

4. Arrangement according to claim 1, further comprising means for positively kinematically controlling movement of the rear lid in the course of its upward swinging.

5. Arrangement according to claim 1, wherein both storage space regions are accessible from above the body frame, and wherein the rear lid has substantially a flat plate shape.

6. Arrangement according to claim 5, wherein the rear lid has a cross-section that is tapered in wedge shape in a region of said one end.

7. Arrangement according to claim 5, wherein the rear lid is swingable up around an axis which extends close to a front end of the rear lid.

8. Arrangement of a rear lid on the body frame of a motor vehicle having a storable top structure, comprising:

a pivoted mounting of the rear lid by which the rear lid is swingable up into a vertical loading position around an axis which extends substantially at one end of said rear lid;

a two-part storage space having an opening in the body frame that is exposed when the rear lid is swung up to allow access to two regions of the two-part storage space, a partial cross-section of the opening in the body frame being respectively associated with each of the two storage space regions; and a slide-swing mounting on the body frame and coupled to the rear lid such that the rear lid is movable into the loading position in which the rear lid is substantially vertically above a boundary region between said two storage space regions.

9. Arrangement according to claim 8, wherein the two storage space regions are arranged one behind the other, and the arrangement further comprising a collapsible top that is storable in the front storage space region, wherein the rear lid is swingable about a transverse axis of the vehicle.

10. Arrangement according to claim 8, wherein the storage space regions are spatially separated from each other.

11. Arrangement according to claim 8, further comprising means for positively kinematically controlling movement of the rear lid in the course of its upward swinging.

12. Arrangement according to claim 8, wherein both storage space regions are accessible from above the body frame, and wherein the rear lid has substantially a flat plate shape.

13. Arrangement according to claim 12, wherein the rear lid has a cross-section that is tapered in wedge shape in a region of said one end.

14. Arrangement according to claim 12, wherein the rear lid is swingable up around an axis which extends close to a front end of the rear lid.

* * * * *